Inventors
Dante Giacosa
Angelo Mosso
By Robert E. Burns
Attorney

Dec. 13, 1955  D. GIACOSA ET AL  2,726,857
REAR WHEEL SUSPENSION FOR MOTOR VEHICLES
Filed July 31, 1951  2 Sheets-Sheet 2
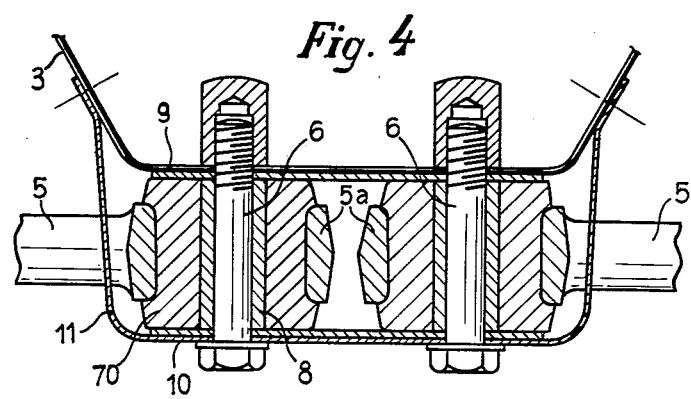
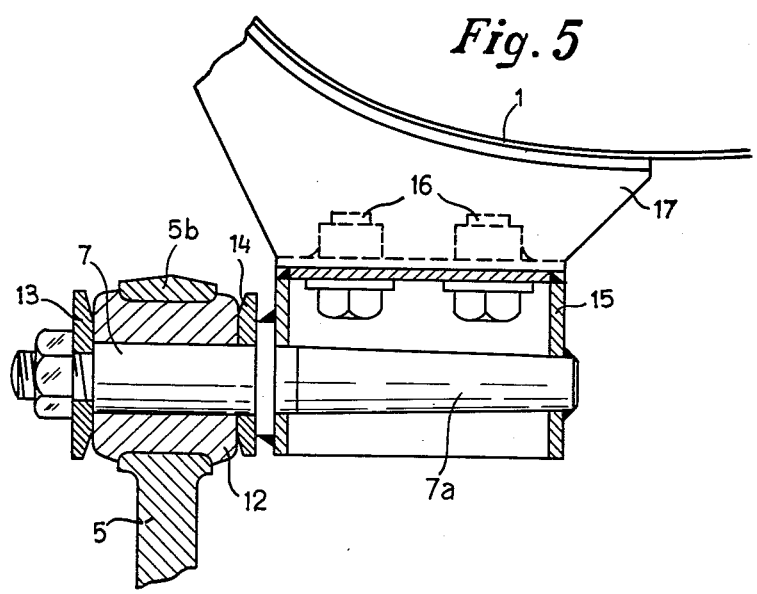
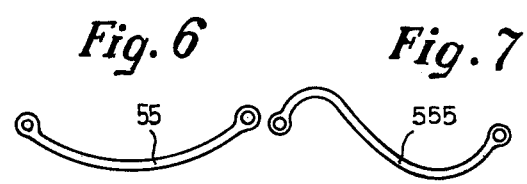
Inventors
Dante Giacosa
Angelo Mosso
By Robert E. Burns
Attorney

United States Patent Office 2,726,857
Patented Dec. 13, 1955

2,726,857

REAR WHEEL SUSPENSION FOR MOTOR VEHICLES

Dante Giacosa and Angelo Mosso, Turin, Italy, assignors to Fiat S. p. A., Turin, Italy Application July 31, 1951, Serial No. 239,421

Claims priority, application Italy August 4, 1950

7 Claims. (Cl. 267—20)

This invention relates to motor vehicles of the type provided with a rigid axle between the two rear wheels and helical springs between said axle and frame.

More particularly, this invention relates to a suspension for the rear axle, in which said axle is connected to the frame or an equivalent member of a chassisless body by means of two longitudinal links or arms and in which a helical spring is interposed between each axle end and the frame.

The object of this invention is to provide a cross connection between the axle and frame constituting an additional resilient system, so as to obtain a suspension of variable flexibility dependently upon the width of the strokes of the axle with respect to the frame. More particularly, it is the object of this invention to provide a transverse connection between the axle and frame comprising additional resilient means cooperating with the helical spring and adapted to afford a resilient resistance increasing with the increase of the load applied to the springs.

These and further objects of this invention will be understood from the appended specification with reference to the accompanying drawings, wherein:

Figure 4 is a section on an enlarged scale on line IV—IV of Figure 2;

Figure 5 is a section on an enlarged scale at the attachments of the cross rods to the frame;

Figures 6 and 7 show two modifications of the cross rods shown in Fig. 1.

Figure 1:
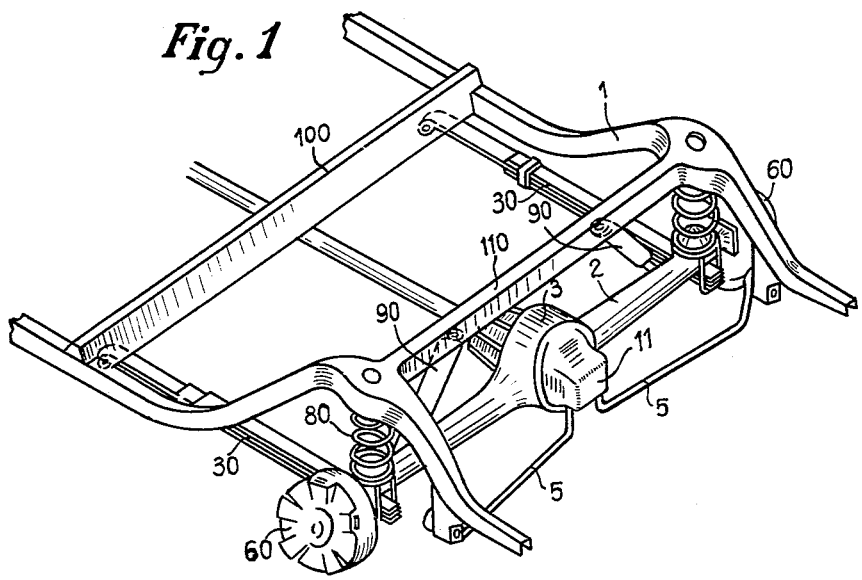
Figure 1 is a diagrammatic perspective view of the suspension.

Referring to Figs. 1 to 5, 1 denotes the frame of a motor vehicle, 2 the rigid axle incorporating the casing 3 of the differential gearing and carrying at both ends supports 60 for the rear wheels 4.

The axle 2 is secured to the ends of two longitudinal arms 30, hinged at their other ends to a cross member 100 of the frame 1.

Two helical springs 80 are interposed between said axle and frame. 90 denotes two telescopic hydraulic shock absorbers likewise interposed between the axle 2 and a cross member 110 of the frame.

The connection in a transverse direction between the axle and frame is established by means of two transverse rods 5 hinged at one end about the pivots 6 to the axle and at their other end about the pivots 7 to the frame.

Figure 2:
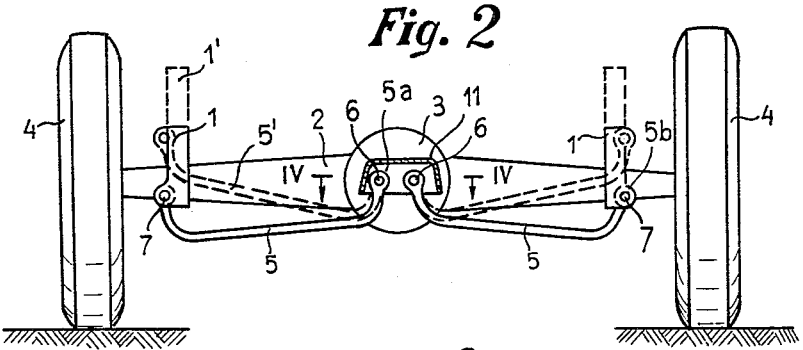
Figure 2 is a diagrammatic rear front part view of Figure 1.

As is clearly visible in Figs. 1 and 2, said rods are of a generally V-shaped profile such as to act resiliently when they are stressed along the line connecting the two pivots 6 and 7. This occurs during relative displacements between the axle and frame on drive. Figure 2 shows in dash lines at 1' the position taken by the frame on its maximum excursion with respect to the axle 2 and at 5' the shape taken by the rods 5 by effect of the corresponding resilient deformation.

Figure 3:
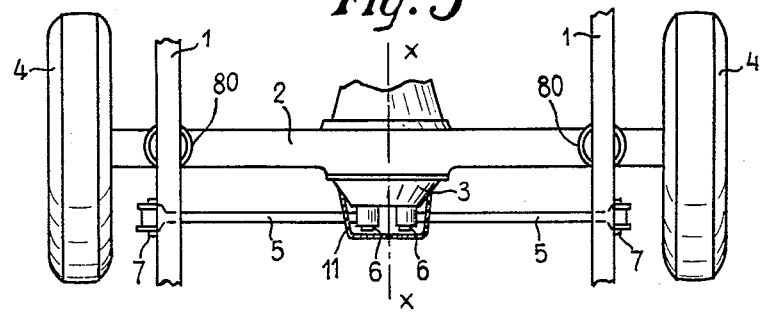
Figure 3 is a plan view of Figure 1.

In the example shown, the axes of the rods 5 are situated in a plane perpendicular to the longitudinal axis X—X in Fig. 3 of the vehicle, but they might alternatively be situated in a plane forming a certain angle thereto.

Moreover, the articulations of the rod ends might be reversed, that is, one rod end might be hinged to the frame in proximity to its longitudinal axis, and the other end might be hinged to the axle end, that is, near the wheels 4.

In Figure 6, 55 denotes a modification of the profile of the rod 5, and in Figure 7, 555 denotes a further modification. It will be understood that many other forms may be adopted, provided they meet the requirement of conferring to the rods elasticity along the line connecting the two end pivots.

It will be clear from the foregoing that operation of the rods 5 does not substantially depend upon the manner in which each of them is connected to the axle and frame, but upon the curved profile of each rod and its inherent elasticity. In fact, in the example shown each rod 5 is curved to a U-shape in its own vertical plane. In operation, on going over for instance from position 1 to position 1', the spacing of the pivots 6 and 7 is altered, so that the U-branches are drawn away from each other and the rod 5 is resiliently deformed. This results in a resilient force variable depending upon the stroke of the axle 2 with respect to the frame 1, which is added to the force of the helical springs 80 stiffening the whole suspension.

In the example shown in Figure 4, the articulation of the rods 5 to the pivots is effected through the interposition of anti-vibrating bearings 70, enclosed in the eye-shaped ends 5a of the rods, and of bushes 8.

The bearings 70 are enclosed, through the interposition of plates 9 and 10, in a casing 11 fitted to the rear front wall of the differential gear casing 3.

In the example shown in Figure 5, the connection between the eyeshaped ends 5b of the rods 5 having pivots 7 is effected through the interposition of resilient bearings 12 clamped between end discs 13, 14.

Each pivot 7 is formed with a conical portion 7a which is welded to a box 15 connected in turn by means of bolts 16 to a member 17 welded to the frame 1.

What we claim is:

1. Rear suspension for motor vehicles comprising, in combination, helical springs interposed between the frame and rear axle, longitudinal reaction arms hinged at one end to the frame and secured at their other end to the axle, and curved rods extending transversely of the vehicle situated in a plane perpendicular to the vehicle longitudinal axis, each of said rods being hinged at one end to the frame and at their other end to the axle and being of a profile such as to resiliently react, when they are subjected to stresses directed along the line connecting its articulation pivots.

2. Rear suspension for motor vehicles comprising, in combination, helical springs interposed between the frame and rear axle, longitudinal reaction arms hinged at one end to the frame and secured at their other end to the axle, and curved rods extending transversely of the vehicle, hinged at one end to the frame and at their other end to the axle, said rods being substantially C-shaped so as to resiliently react when they are subjected to stresses directed along the line connecting their articulation pivots.

3. Rear suspension for motor vehicles comprising, in combination, helical springs interposed between the frame and rear axle, longitudinal reaction arms hinged at one end to the frame and secured at their other end to the axle, and curved rods extending transversely of the vehicle, hinged at one end to the frame and at their other end to the axle, said rods being substantially U-shaped so as to resiliently react when they are subjected to stresses directed along the line connecting their articulation pivots.

4. Rear suspension for motor vehicles comprising, in combination, helical springs interposed between the frame and rear axle, longitudinal reaction arms hinged at one end to the frame and secured at their other end to the axle, and curved rods extending transversely of the vehicle, hinged at one end to the frame and at their other end to the axle, said rods being substantially S-shaped so as to resiliently react when they are subjected to stresses directed along the line connecting their articulation pivots.

5. Rear suspension for motor vehicles comprising in combination helical springs interposed between the frame and rear axle, longitudinal reaction arms consisting of members hinged at one end to the frame and secured at their other end to the axle, and curved rods extending transversely of the vehicle, each of said rods being provided at its ends with eyes, rubber bushings in said eyes, articulation pivots extending through said eyes and secured to the axle and frame, respectively, said rods resiliently reacting to transverse stresses.

6. Rear suspension for motor vehicles, as claimed in claim 5, comprising a casing secured to the axle and enclosing the eyes and bushings at the ends of said cross rods hinged to the axle.

7. Rear suspension for motor vehicles, as claimed in claim 5, in which the bushings in the eyes of said cross rods articulated to the frame are clamped between two end discs, and in which the articulation pivots have a conical spindle secured in a metal box connected to the frame.

References Cited in the file of this patent

UNITED STATES PATENTS

| Number | Name | Date |
|---|---|---|
| Re. 14,192 | Trott | Sept. 12, 1916 |
| 1,050,508 | Ahrweiler | Jan. 14, 1913 |
| 1,185,378 | Crawford | May 30, 1916 |
| 1,231,066 | Reynolds et al. | June 26, 1917 |
| 1,970,859 | Lenze | Aug. 21, 1934 |
| 1,977,547 | Forsyth | Oct. 16, 1934 |
| 2,182,248 | Chayne | Dec. 5, 1939 |
| 2,300,844 | Olley | Nov. 3, 1942 |